United States Patent [19]

Oliphant et al.

[11] Patent Number: 4,881,261

[45] Date of Patent: Nov. 14, 1989

[54] METHOD FOR PREDICTIVE PACING-OF CALLS IN A CALLING SYSTEM

[75] Inventors: Jean R. Oliphant, Aurora; Harold W. Workman, Naperville, both of Ill.; Jasvantrai C. Shah, Richardson, Tex.

[73] Assignee: Rockwell International Corporation, El Segundo, Calif.

[21] Appl. No.: 245,097

[22] Filed: Jun. 29, 1988

[51] Int. Cl.⁴ .................................................. H04Q 3/00
[52] U.S. Cl. ..................................... 379/215; 379/265; 379/266; 379/309
[58] Field of Search ................. 379/92, 269, 265, 266, 379/309, 215

[56] References Cited

U.S. PATENT DOCUMENTS

3,989,899  11/1976  Norwich .......................... 379/92 X
4,599,493  7/1986  Cave ................................ 379/309 X Primary Examiner—James L. Dwyer
Attorney, Agent, or Firm—C. B. Patti; V. L. Sewell; H. F. Hamann

[57] ABSTRACT

A system having calls substantially selected and dialed to customers at such a paced rate that the system will keep a group of agents at full occupancy with calls on which the system has detected voice answer. As the size of the agent group changes, this predictive pacing is adjusted so that answered calls do not have to be delayed while waiting for an available agent or agents do not have to wait for calls to become available.

5 Claims, 1 Drawing Sheet

FIG. 1

METHOD FOR PREDICTIVE PACING OF CALLS IN A CALLING SYSTEM

BACKGROUND OF THE INVENTION

The present invention relates in general to computer controlled outbound calling systems, and in particular to a system in which a group of agents can be kept busy with a minimum waiting period for any answered call.

The present invention may be utilized in an environment such as Rockwell International's Galaxy Automatic Call Distribution (ACD) system.

Three equipment groups comprise the Galaxy ACD: the digital switching network, the voice switch interface hardware and the agent and supervisor equipment.

The all solid-state computer-controlled digital switch is the hub of the operating system. Analog voice paths are converted to digital signals and cross-connected under computer control according to assignment and priorities. Encompassing the digital switch is the digital-to-analog and analog-to-digital channel bank equipment, which changes the analog telephone signals to digital form for connection through the switch. Connected peripherally to this hub are the telephone trunks, the agent positions and other equipment.

Because the system operates under programmed computer control, many operating options can be exercised by changes in program parameters. Definition of primary and alternate gates and the assignment of trunks and agent positions to a gate are made by table entries which can be altered as rapidly as operating conditions dictate.

Incoming calls on trunks assigned to a particular gate are routed in the exact order of arrival to associated agent positions. If all agents in that primary gate are busy, calls may be handled by an agent with a secondary assignment for that gate. A recorded voice announcement (which the calling party does not hear) identifies the origin of a call to the agent serving the call.

Incoming calls that cannot be handled immediately because all agents are busy can be given an optional delay announcement and placed in the incoming call queue, to be served as soon as an agent is free. The queued calls are then distributed sequentially on a first-come-first serve basis. During nonpeak calling periods, an agent completing a call is placed at the bottom of the call assignment queue to ensure equitable work distribution among agents. During peak periods when calls are waiting, the oldest call is routed to the first available agent.

The agent set is a compact, easy-to-use unit designed to speed the handling of incoming calls and to provide rapid access to supervisory assistance when required. All sets utilize membrane switch technology, greatly reducing maintenance because the keys have no moving parts.

The master and group supervisor position equipment employs a control set similar to the agent set and a CRT display unit as well as a headset/handset. The supervisor set includes all the functions of the agent set plus two outgoing line selectors, barge-in and monitor functions. The master supervisor set also contains control keys to play back delay announcements and to record new announcements on the system delay recorders.

Group supervisors monitor the operating status of agents assigned to the group and provide assistance to the agents as requested. Such requests are displayed on the CRT.

The master supervisor can monitor general system performance, as well as selectively monitor individual agent groups as desired, and can request and receive hard copy reports at any time. The master supervisor also has the capability to change agent and trunk assignments by keyboard entry on the CRT.

Rockwell has, in addition to the Galaxy ACD which functions as described in the previous paragraphs, an adjunct system to the Galaxy ACD called the Galaxy Contact System for Marketing.

The Tandem Non Stop computer is the heart of the Contact System which is the Galaxy Database Applications System for inbound/outbound call management. Like the Galaxy, the Tandem Non Stop architecture assures continuous operation of application programs.

The basic Tandem Non Stop system contains two Call Processor Units (CPU's). Expansion of the system is achieved by adding CPU's, cabinets, disk units and peripheral hardware to serve additional CRT's as required. This modular growth is accomplished within slots in the cabinets until they are full. When this occurs, another cabinet is added. Four CPU's can be placed in one cabinet, and there can be a total of four CPU cabinets in a system.

Just as in the Galaxy ACD, all critical Tandem Non Stop components are replicated, particularly the processors, memory and busses, with all processors doing useful, independent work. A small portion of each processor's capacity is used to maintain a backup of the other processor's activity. In the event one processor fails, the other processor immediately takes over to continue operations.

In addition to providing extremely fast response times to the data, each disk drive on the Tandem Non Stop can be individually replaced while the unit is online and operating. Each disk unit has dual disk controllers so that additional redundancy is again provided at this level of service.

The CRT's used in this system are Tandem's model 6526. The terminal has a 14-inch, non-glare, green phosphor screen. The CRT's are connected to the system with controller hardware that assures redundancy throughout, to achieve high reliability.

SUMMARY OF THE INVENTION

The present invention involves a system having calls automatically selected and dialed to customers at such a paced rate that the system will keep a group of agents at nearly full occupancy with calls on which the system has detected voice answers. As the size of the agent group changes, this predictive pacing is adjusted so that answered calls do not have to be annoyingly delayed while waiting for an available agent because for pacing rate is too high, nor do agents have to wait often for calls to become available because the pacing rate is too low.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, in the several figures of which like reference numerals identify like elements, and in which:

DESCRIPTION OF THE PREFERRED EMBODIMENT

The present invention has general applicability but is most advantageously utilized in Rockwell International's Galaxy Contact System for Marketing. An overview of this system will now be described.

The Galaxy Contact System for Marketing is an integrated series of computer programs designed to provide a business with a technique for conducting, managing, and analyzing sales and marketing promotions. It is a complete telemarketing system running on the Tandem Non Stop computer and integrated with the Galaxy ACD for both inbound and outbound calling. A data link between the Tandem Non Stop computer and the Galaxy provides for information exchange between the two systems. It automatically matches inbound calls to scripts so that call startup time is reduced and call personalization can occur. Outbound autodialing with both scheduled and campaign calling is provided so that the call volume can be increased by eliminating agent dialing time and errors.

The Galaxy Contact System for Marketing is a fully featured telemarketing software package integrated with the inbound and outbound calling features of the Galaxy ACD. The system is written in COBOL and is designed to run on a multi-processor Tandem Non Stop computer. The fault tolerance, relational database, and on-line-transaction processing capabilities of the Tandem computer are used to provide expandability and fast response for all applications.

The Galaxy Contact System for Marketing utilizes agent-and-system-controlled autodialing, extended DNIS, and trunk-to-agent assignment features of the Galaxy ACD. Agent log-on with reconfiguration changes, log-off, and agent available and unavailable state control are also implemented to interface with the Galaxy ACD.

The Galaxy Contact System for Marketing package interfaces to the Galaxy ACD by way of the Gallaxy Contact System Distributor software. This software is a prerequisite for the Galaxy Contact System for Marketing package. The Galaxy Contact System Distributor software provides the data line protocol and the data message interface between the Galaxy ACD and application programs on the Tandem Non Stop such as the Galaxy Contact System for Marketing.

On-line commands are provided to cover all phases of system operations so that offline processing is not required. A multitude of reports are provided so that the performance of the agents, system, media, campaigns, and script organization can be analyzed for improvement steps. And finally, the system is menu- and function-key driven so that it is easy and enjoyable to use, thus leading to employee satisfaction and resultant productivity increases.

System Functions

· The system functions are those capabilities related to the support of the Galaxy Contact System for Marketing.

Several functions within the Galaxy Contact System for Marketing fall into the system category. One of these is the control of access to the system features by operators and agents. Access is allowed and privileges are allocated at log-on, based upon the person's identifier and password. This information is validated and if access is allowed, then the associated security level is used to provide a selection menu. Multiple levels of security are provided.

Access to functions is by selection menus and the use of function keys. Function keys are provided to step through menus progressively and also to make a full jump to selected functions regardless of the current operation.

The call processing functions handle the automatic scheduling and rescheduling of outbound calls for preassigned agents and for the automatic presentation of scheduled calls based on call priority and call back date and time. The present invention provides a novel predictive pacing algorithm for use in outbound call processing.

The script management function provides for on-line creation, modification and deletion of scripts. Scripts are the instruction presented to the agent for his/her conversation with the customer. Scripts can be updated during the conversation. The system allows for up to 1000 scripts. Each script begins with a main first level with up to 99 lines of text. From the main script, branching to nine subscripts can occur by the use of function keys. Each subscript can again branch to nine further subscripts. This can continue in turn for eight levels. The function key choices with the description associated with each is script and subscript dependent. The usage of any of these keys during script execution is automatically totaled and can be printed for analysis and statistical purposes.

Scripts are assigned to campaigns, DNIS numbers or trunk identifications, and for default situations with inbound calls when DNIS or trunk identifications are not provided.

Unique multiple campaigns can be constructed from the database of customer/prospect records. The system allows up to 9999 campaigns to be defined. Once the selection criteria, such as "equal to" or "greater than" is specified for the desired data elements for a campaign, then the system searches the data base for all records satisfying the selection. Specific form letters and product brochures can be assigned to the campaign. During the execution of the campaign, the agent can enter sales history and notes into the customer/prospect record in addition to entering other key information. The appropriate form letter(s) can be selected and notes added. The system will automatically fill in key information in the form letter to customize it for the customer/prospect.

Mass mailings can be performed with the system. The supervisor must define the campaign and select the letters (up to three per run) and brochures (up to three per run). During the daily call file build run, the letters, labels and brochure selections will be queued for printing.

Agent Functions

An agent must successfully log onto the system before work can begin. The log-on requires personal identifiers for security on the Tandem Non Stop and agent performance on the Galaxy ACD. The extension number for the agent console must also be entered. This information is validated and sent to the Galaxy ACD along with the configuration data (assignments to supervisor, information group and gates).

An agent who has successfully logged onto the system is then presented a master menu of functions available to the agent. From this menu, the agent who has specific clients can select to review the calls scheduled for the day. The system presents the scheduled calls to the agent's CRT screen. The agent can then inactivate selected calls for the day. These calls are then rescheduled automatically for the next day. After the preview session, the agent can select to begin call processing of all the scheduled calls or to make a specific call. To make a specific call, the agent selects that menu option and then selects the customer/prospect on the screen. The agent then presses the DIAL function key to have the call automatically dialed.

If the agent does not have specific clients to call or is finished with the scheduled calls, then the agent could elect to go into the cold/campaign calling mode. In this mode the agent would wait for an inbound call or a system-generated campaign call. The processing with respect to the agent is almost the same for both of these types of calls. The script associated with the call type is presented to the agent upon connection of the inbound call. If the call type cannot be identified from the incoming digits on the trunk, i.e., undefined DNIS number, then a menu of available campaigns is presented, and the agent is allowed to pick the most appropriate.

The agent uses function keys to progress through the script and to exit from it to do call wrap-up. During wrap-up, letters can be selected and customized with up to 180 characters of text. The system automatically fills in other optional information, such as the date, time, salutation, and address, to personalize the letter.

Supervisor Functions

The supervisor functions are protected from unauthorized access by nonsupervisors at the time of logging-on the system by the security level internally assigned to the individual. The individual successfully logging-on with access to supervisor functions can also perform agent functions as well as the exclusive supervisor functions. The master menu presented offers both agent and supervisor functions.

The supervisor is responsible for database management, report generations, campaign and script management, and call pacing control. The supervisor can rapidly access these functions through menu selections with function keys. The database management functions include customer/prospect record addition, deletion and modification beyond that allowed to the agents. This also covers other databases, such as media analysis, field rep and agent files, and the configuration assignments with respect to the Galaxy ACD for the agents.

A measure of the quality of a system is the variety and quantity of reports provided to the user. The Galaxy Contact System for Marketing provides a multitude of reports, all menu selectable. The reports provide the information necessary to evaluate agent and system performance, script organization, survey totals, sales volumes, media impact, field rep performance, database content and others.

For instantaneous performance information relative to an agent, campaign or the system, there are several on-line displays which can be requested to be displayed on the supervisor's screen. These displays show a snapshot of the status; they are not updated in real time.

Call Pacing

The novel call pacing management functions are provided for system-controlled outbound calling with the Galaxy ACD. The supervisor utilizes the call pacing display and update screen to activate and deactivate call pacing. The supervisor specifies the ACD gate (queue for a group of agents) for every new campaign. Once set up, individual campaigns can be activated, temporarily deactivated or removed from the system. The supervisor can use the ACD system gate status display and the progress display for information to be used in deciding how to adjust the call rate.

A campaign which is activated for system-controlled autodialing will be automatically controlled by the system. Calls will be sent to the Galaxy ACD at the pacing rate set by the system. A call sent to the ACD for autodialing contains the 10-digit phone number, the ACD gate number, and the first, middle and last name of the person being called. The names are displayed for the agent at the time the call is connected to the agent if the optional Individual Station Display Unit is implemented on the Galaxy ACD. A call which is detected for answer will be assigned to the first available agent in the gate. Calls which are delayed may receive recordings and music. When the agent is assigned, the agent assignment and call identification are sent to the Tandem Non Stop for the Galaxy Contact System for Marketing so that the customer/prospect record screen can be placed before the agent. If a problem such as no answer, busy, all trunks busy, or reorder tone is encountered while placing the call, then the ACD informs the Tandem Non Stop and Galaxy Contact System for Marketing. The Contact System will either requeue the call for retry after all other scheduled calls or remove it from the calling list and flag it as a problem. The supervisor can specify for each problem condition whether retry or requeueing should be done if a problem is encountered.

The Galaxy Contact System for Marketing requires a Tandem Non Stop computer with a CRT terminal for each agent. The number and type of Tandem CPU's, disk and controllers, CPU memory, and I/O interfaces to the CRT's all play a part in the response time equation. The response time to be guaranteed, system location and growth requirements all have a part in determining the configuration of the Tandem Non Stop computer.

One of the major issues facing the designer of a fully automated outbound dialing system is the problem of call pacing; that is, determining the rate at which new calls should be dialed so that available gate servers typically such as agents, but also other devices such as announcers and recorders, are efficiently utilized while called parties are not subjected to unacceptable delays. The present invention provides an algorithm which may be used to resolve the pacing issue.

Figure 1:
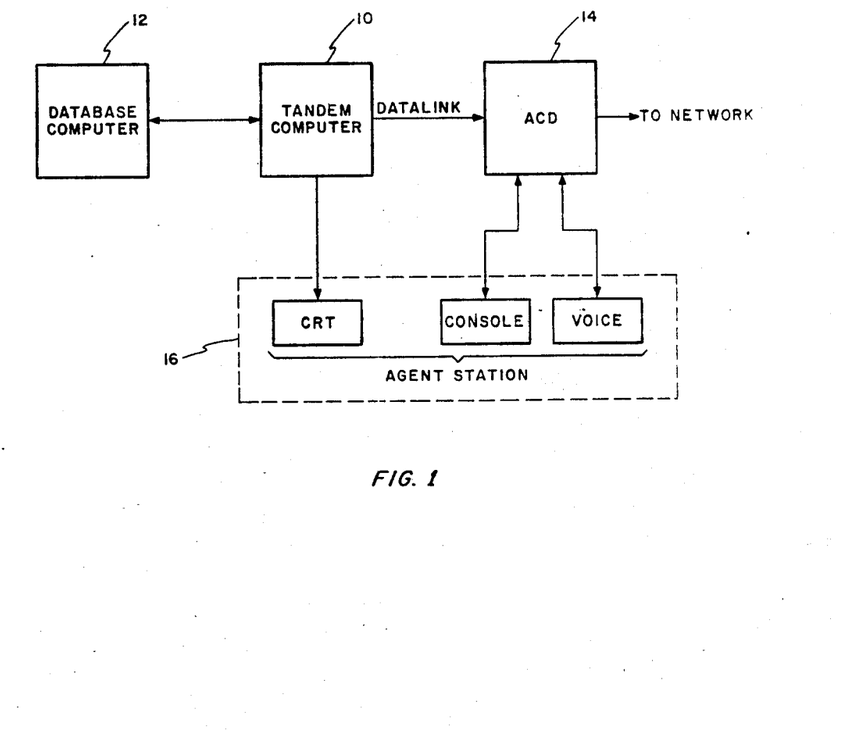
FIG. 1 is a general block diagram of a system implementing the method of the present invention.

In defining the algorithm, assumptions have been made about the environment surrounding the solution. The solution is assumed to be implemented on a telephone system capable of automatic call distribution (equivalent to the Rockwell Galaxy ACD), interacting with a database system such as the Tandem Non Stop computer as shown in FIG. 1. The call pacing algorithm is envisioned as being a set of software routines comprising a program executing on a Tandem Non Stop computer 10 linked to an optional database computer 12 and providing instructions to the ACD 14. This program will be called the pacer. The objective of this pacing algorithm is to initiate new outgoing calls at a rate which minimizes the average delay in queue while maximizing the agent 16 utilization.

The telephone system used comprised of the ACD 14, is assumed to have certain functionality, including the capability of interacting with the database system 10, 12, the ability to route and place outbound calls, to detect voice answer, and to place the resulting completed calls into a queue (gate) for servicing. The interaction with the database system 10, 12 must include, as a minimum, the following:

(1) The ability to accept dialing instructions from the database system 10, 12, and to notify the database system 10, 12, of the results of the dial request, including information regarding the resulting system connection. The dialing instructions should include information regarding the desired queue into which the call is to be placed, as well as an identifying serial number or sequence designation by which the individual dial request may be referenced in later communications.

(2) The ability to supply the database system 10, 12, with information regarding the connection of incoming and outgoing calls, the status of individual agents 16 in the system, and the state of the system queues, so that the database system 10, 12, has an accurate current picture of conditions within the ACD 14.

The basic model is that the database system has a list of calls (e.g. a campaign) to be placed through the ACD 14. These calls, when answered, will be placed in a queue and then routed to an agent 16 when available. For purposes of the model, all calls will always be routed to the same queue, with routing to secondary queues assumed to be very infrequent. The combinational effects of multiple campaigns in a single queue are assumed to be minimal, so that they appear to be a single campaign. It is a simple extension to have multiple campaigns if each is assigned to different queues.

The method of call pacing offers several positive features to the system designer. First, the method is capable of achieving a zero maximum delay in queue. This may be a desirable operating strategy in certain end-user applications or in cases of extremely small numbers (1-5) of agents 16. Second, the number of calls being handled is always limited to an upper value, so that adverse distribution situations are avoided which cause large queues to form. Third, the pacing algorithm adjusts the pacing rate to achieve the desired delay in queue, automatically accounting for differences in average call setup times and average agent holding times which will vary from one campaign to another. The adjustments to the pacing rate keep the average delay in queue at the desired value. Fourth, the pacing algorithm also accounts for the number of agents participating in the campaign. If agents are diverted to other work or are added, the pacing algorithm adjusts the rate to keep the average delay in queue at the desired value. Finally, calls may be paced with a large agent group to achieve nearly 100% agent utilization while maintaining an acceptably small delay in queue.

The operating procedure for the pacer is to deliver new calls to the ACD 14 so that the total number of calls being managed by the ACD is kept at a constant number. The value of this constant number determines the pacing rate and the average delay in queue. Calls being managed by the ACD 14 fall into one of three categories:

(A) Calls in the process of being set-up, including route selection, trunk selection, dialing, and tone (ringback, busy, reorder, tri-tone, etc.) or voice answer detection.

(B) Calls in queue, awaiting an available agent 16.

(C) Calls connected to an agent 16.

The pacer strives to keep the total of all calls in these categories a constant K. At the beginning of the calling session, the pacer will initiate calls until K dial requests are in progress by the ACD 14. If a dial request is reported by the ACD 14 to have failed during call set-up, a new dial request is initiated. Similarly, if a call is abandoned from queue, or when the agent 16 disconnects, new calls are initiated. This process is continued until the end of the session, when new calls are ceased altogether.

The pacer operates to calculate a value for K which will achieve the objective of controlling the delay in queue from call answer by the called party to call assignment to an agent 16. The pacer periodically adjusts the value of K from real-time call statistics supplied by the ACD 14 and from parameters supplied by the system supervisor.

CALL PACING CALCULATION ROUTINES

The Galaxy Contact System for Marketing contains two major call pacing routines, CALC and ALGO. Message traffic between these pacing routines and the ACD passes through the Communications Oriented Process (COP). This process translates messages and also maintains integrity and status.

The calculation routine (CALC) maintains operational data, computes averages, and passes parameter values to the ALGO routine. The activity within CALC required to satisfy each of these functions is controlled by the parameters received at run time and the specific processing required for each type of system message.

All system messages passed to CALC generate updates to the data set controlled by CALC. Additionally, the processing of dial related system messages always results in parameters being passed to the ALGO routine.

PROCESSING ACTIVITY

The processing within CALC can be logically defined as common operations and a set of three interdependent processing modes, the Startup, the Averaging, and the Steady State modes. The set of parameters passed to the ALGO routine is fixed, i.e. does not vary with processing activity. However, the specific value of each of the parameters passed will change as CALC's processing mode changes.

The common processing activities within CALC include maintenance of the extended memory buffer and specific processing variables. The variables, or counts, include the number of calls in setup, the number of calls in queue, and the number of calls at agents. The SIGN-IN, AGENT AVAILABLE, TRUNK-TO-AGENT CONNECT, and SIGN OUT data messages which are received from the ACD are used to update entries in the extended memory buffer and to establish the value of the maximum number of agents working, the setting of the processing indicator switch, DOKAY, and to update the count of the number of calls at agents. The CALL DIALED AND QUEUED data message from the ACD is used to update the number of calls in queue and the number of calls in setup. The output from the ALGO routine is used to update the value of the number of calls in setup. Note that the number of agents working and the DOKAY switch setting are key values in ALGO's processing after the system reaches steady state. Simple addition and subtraction are used to update the call disposition counts as the messages are processed by CALC.

The first processing mode, operational mode switch value of 0, is known as startup mode. In this mode, the data messages of importance are the AGENT AVAIL- ABLE, the SIGN OUT, and the CALL DIALED AND QUEUED messages. Each time the AVAILABLE message is received the memory buffer will be searched. If the message is from an agent not yet in the buffer, the agent count variable TOTGENT will be increased by one and the agent's ID will be entered in the buffer. If the agent ID is in the buffer, the message will be ignored. When a SIGN OUT message is processed for a known agent, and the agent's ID is in the buffer, the value of the agent count will be decreased by one and the buffer entry deleted. As each CALL DIALED AND QUEUED message is received, CALC will increment the dial request counter variable DREQCNT by one. When the value of DREQCNT reaches twice the value of TOTGENT, the value of the mode switch will be changed to 1 and the averaging switch will be set to true indicating the end of startup mode activity.

The second mode of operation, operational mode switch value equal to 1, is known as averaging mode. In this mode all messages are significant. Since none of the data needed for averaging is contained within the messages received, the CALC routine stores intermediate values, mainly time stamps, in the extended memory buffer. As AGENT AVAILABLE or SIGN OUT messages are processed the call length variables are updated. In addition, the total agent count and the extended memory buffer will be updated as described in startup processing. Each time a dial message is received by CALC the averaging counter variable DOAVECNT will be incremented by one. Then the data accumulator variables specific to each dial message type will be updated. The specific processing of dial messages is described in the computing averages subsection. When the value of DOAVECNT reaches 100, the averages for call setup time, average queue time, and call hold time will be extracted from the appropriate field in the message from the COP, the number of working agents will be assigned to the control variable CHNGCNT, and the DOKAY switch will be set to true. In addition, the operational mode switch value will be changed to 2, the averaging switch will be set to false, and the steady state switch will be set to true, indicating the end of averaging mode activity.

The third mode, operational switch value equal to 2, is known as steady state mode. Once the CALC routine reaches steady state operation, the only items of importance are the total number of agents and the total number of calls in the system. These parameters are the only values that are not held constant in steady state. The AGENT AVAILABLE and SIGN OUT data messages are processed as previously described to update the total agent count, and additionally, to set the DOKAY switch to true when the difference between the number of agents working and the value of CHNGCNT is 5 or more. The CALC routine will remain in steady state mode until the program is stopped.

PASSING VALUES

The specific value of each variable passed to the ALGO routine is controlled by the current setting, true or false, of the steady state switch variable STDYSTAT.

If the value of STDYSTAT is false, not at steady state, the value of all the parameters passed will be zero (0) except for the value of the number of available agents. The current available agent count will be passed to ALGO.

If the value of STDYSTAT is true, at steady state, the value of all the parameters passed will be equal to their computed and current values.

COMPUTING AVERAGES

The COP process will accumulate the data required to compute averages for use by the CALC routine only when the logical value of the DOAVE switch is true and the value of DOAVECNT is less than 100. An extended memory buffer, containing two tables, is required to compute the average setup time, the average queue time, and the average call length values.

The data in the first table is used to compute the setup time and queue time variables. This data is keyed to the CALL SERIAL NUMBER field in the DIAL REQUEST message. Data in the second table is used to compute the call length. The data in this table is linked to the AGENT ID field in the AGENT AVAILABLE and SIGN OUT messages.

When a copy of a DIAL REQUEST message is received, an entry in the first table will be created containing the call serial number and a timestamp. When the CALL DIALED and QUEUED message is received, the corresponding REQUEST entry will be found and the average setup time variables will be updated. A timestamp will be added to the table which represents the beginning of the queue time.

When a TRUNK ABANDONED message is received, the matching CALL QUEUED entry will be found, in the first table, and the queue time variables will be updated. The entry will then be purged from the table.

If an AGENT CONNECTED message is received, the queue time values will be updated, and the second table will be searched for a match with the agent's ID. When found, the entry in the first table will be deleted and the entry in the second table will be updated with data from the first table entry plus a timestamp. The additional timestamp represents the beginning of the call length time.

Finally, when either an AGENT AVAILABLE or SIGN OUT message is received, the matching CONNECTED entry will be found in the second table and the average call length variables will be updated. The entry will then be purged from the table.

The averages will be calculated once at the end of averaging mode. By convention, three variables will be used for each of the ALGO parameters defined to be an average. The value for each of the averaged parameters will be computed in the following manner: $SXXAVE = SXXTOT/SXXCNT$ The prefix (S) identifies the variable as a parameter passed in steady state operation. The suffix (CNT) denotes the number of times the item was updated for averaging. The suffix (TOT) indicates the sum of the updates to the item. The suffix (AVE) denotes the computed average for the item.

MAINTAINING DATA

The total data set maintained by CALC, for use by the ALGO routine, can be logically divided into three groups. The groups are named for the relative time that the data is acquired or used. The first group identifies the startup data values, the second identifies the pre steady state values, and the third contains the post steady state variables.

STARTUP

* Operational Mode Switch (OPMODESW)
* Maximum Time Permitted In Queue (MAXPQT)
* Expected Maximum Number of Agents (EXPMNAG)

PRE STEADY STATE

* Average Que Time (PQTAVE)
* Average Setup Time (PSTAVE)
* Average Call Length (PCLAVE)
* Number of Calls in Queue (PNCQCNT)
* Number of Calls at Agents (PNCACNT)
* Number of Agents Available (PNAACNT)
* Maximum Number of Calls in System (PMNCSCNT)

POST STEADY STATE

* Re-compute constant switch (DOKAY)
* Computed Average Queue Time (SQTAVE)
* Count of Updates to Queue Time (SQTCNT)
* Value of Updates to Queue Time (SQTTOT)
* Computed Average Setup Time (SSTAVE)
* Count of Updates to Setup Time (SSTTOT)
* Computed Average Call Length (SCLAVE)
* Count of Updates to Call Length (SCLCNT)
* Value of Updates to Call Length (SCLTOT)
* Number of Calls in Queue (SNCQCNT)
* Number of Calls in Setup (SNCSCNT)
* Number of Calls at Agents (SNCACNT)
* Number of Agents Available (SNAACNT)
* Maximum Number of Calls in System (SMNCSCNT)

ALGORITHM ROUTINE

The ALGO routine contains two related types of computational activity. The first is used to compute the desired constant number of messages (K) for the pacing system. The second produces the incremental number of messages (DR) required to maintain the system message count at the desired level.

COMPUTING K

The code needed to compute the value of K, the constant number of calls within the system, has been divided into three phases. ALGO will perform the computation for K each time CALC sets the DOKAY switch to true. After K has been recomputed, the switch will be reset to false.

Phase one is the most involved part of the calculation of K. In this phase two parallel computations are performed which, at convergence, yield the value of the average delay in queue and the value of the rate of agent call connection. The first computation is coded as a straight line evaluation which provides the value of RATEA. The second computation is coded as an iterative loop and provides the value of RATEB. A lookup table evaluates RATEA*SSTAVE (see below) if the absolute value of RATEA*SSTAVE is 10 or less. If the value is greater than 10, the integer and fractional components will be evaluated separately. Then the two results are multiplied together and the sum divided into one. The computations are linked in that the first supplies a trial value of RATEA to the second and the second supplies a new value for available agents to the first.

Part A: RATEA=(TA−CAG)/CL

| SYMBOL/DEFINITION | |
|---|---|
| TA | — Total number of Agents working |
| CL | — Call Length averaged by CALC |
| CAG | — Computed number of Available Agents. Initial value of CAG = 0. |
| RATEA | — An initial estimate of the rate of agent call connection |

Part B: Using g, f, and q as functions of i, and
$g(o) = f(o) = 1, i = 0$, then
$g(i + 1) = (g(i) * RATEA * SSTAVE) / (i + 1)$
$f(i + 1) = f(i) + g(i + 1)$
$q(i + 1) = ((i + 1) * f(i + 1)) - (f(i)) * RATEA * SSTAVE)$
$D = q(i + 1) * (1 / e^{RATEA*SSTAVE})/RATEA$ The interactive loop calculation is repeated until D reaches or exceeds MAXPQT. Then

| | |
|---|---|
| CAG | = (RATEA * SSTAVE) - i + (D * RATEA) |
| RATEB | = (TA - CAG) / CL |

| SYMBOL/ DEFINITION | |
|---|---|
| RATE B | — An improved estimate of the rate of agent call connection. |
| TA | — Total number of Agents working |
| CL | — Call Length averaged by CALC |
| CAG | — Computed Number of Available Agents |
| MAXPQT | — The maximum allowable average delay in queue, as specified by the system supervisor. |
| SSTAVE | — Steady state Average call Setup Time |

Phase two of the calculation tests for convergence and sets the value of the maximum number of calls allowed in the queue. Phase two loops back to phase one until the computations have converged. Convergence is defined as "no significant variance in the value of connection rate determined in phase one". The value for the number of available agents at convergence is used to establish the value for the maximum number of calls allowed in the queue, MAXQ.

MAXQ=CAG

If RATEA−RATEB>0.0001, then convergence exists.

Phase three provides the value of K by adding the maximum number of calls allowed in the queue from phase two to the value of the number of agents working from CALC.

K=MAXQ+TA

The following referenced equations are set forth in Appendix A.

The value of K is the maximum number of calls allowed to be in progress in the system at any one time, as expressed by equa- tion 7. The pacing algorithm observes the number of calls in the ACD system and initiates a new outbound call only when there are less than K calls in the system. The worst queuing case is that all agents are busy (NA=M), that no calls are being set up (NS=O), and that the remainder of the calls are in queue (NQ=QMAX). This is the condition expressed by equation 5, which is equation 7 and 8 with the above values substituted. The value K is calculated so that the average number of calls in queue (and hence the average delay in queue) will not exceed the desired delay.

The situation is analyzed by asking what the probability is for every possible combination of calls, that is, list all the possible ways to divide calls between the set-up state, the queue state, and the connected state, and then assign a probability to each for its frequency of occurrence.

The number of idle servers NI can be computed by equations 9 and 10. In equation 9, there are calls in queue, but not in equation 10. The number of calls in queue can then be computed.

Equations 11 and 12 describe the number of calls in queue (NQ) if the number of calls in set-up (NS) is known. Then equation 13 describes the probability of having exactly NS calls in the set-up state. If necessary, equation 13 can be rewritten as equation 14. Combining these equations leads to equations 16, 17, and 18 which tell us the average number of calls in queue (Q) if a value for QMAX, R, and S is given. Unfortunately, QMAX is not known, for it is the quantity to be determined.

So, QMAX is arbitrarily chosen and the answer is checked beginning with QMAX=1, we calculate equation 17 and determine a value for Q. We then use equation 19 to calculate the average delay in queue (D). Changes are the delay is very small, QMAX is increased to 1 and equations 17 and 19 are calculated again. As QMAX is increased D will increase, until finally it exceeds the specified value (DMAX). At this point equation 5 is used to solve for K.

It is important to assign a value to QMAX which is as large as possible, because large values of QMAX mean a high occupancy for the agents. Small values mean that too many agents are idle, waiting for the next call. Idle agents cost money, for they are nonproductive. In contrast however, large values of QMAX mean that completed calls remain in queue without being serviced by an agent. So QMAX is only as large as necessary to just meet the average delay which can be tolerated.

The calculation of equation 17 requires numerous summations, each summation having exponents and factorials. Also, for each new value of QMAX to be tried, the entire summation must be recalculated.

Equations 1, 2 and 3 give a method to calculate Q for any QMAX if some information from the previous calculation for QMAX−1 is retained. The number of steps is reduced and large factors are not calculated.

The set of equations 1, 2 and 3 were arrived at by expanding equation 17 for two cases: QMAX and QMAX−1. The difference between these two series were noted, and terms were arranged so that the value for Q at QMAX+1 could be calculated using the calculations previously done for Q at QMAX. This collection of terms lead to equations 1, 2 and 3.

In equation 1, the function q(i+1) corresponds to Q in equation 17, where the value of the independent variable, i+1, is the next value of QMAX to be calculated and checked. The value of f(i+1) needed in equation 1 is calculated by using equations 2 and 3. The necessary values for f(i) and g(i) have been retained from having calculated q(i) previously. The values of R and S are constants.

Finally, equation 4 corresponds to equation 19, and is used to check against the acceptable delay DMAX. If the delay is less than DMAX, then i is increased by 1 and equations 1, 2 and 3 are repeated.

Finally, the value of R used above comes from equation 6, which uses the average value of idle servers (I). An initial value R is determined by estimating a value for I. If the check reveals a poor initial guess, then R is recalculated using the new value of I, and a new value of QMAX is found.

Having determined a value for QMAX, then K can be determined and used for the POST STEADY STATE pacing operation.

COMPUTING DR

In order to provide the maximum processing efficiency, the ALGO routine contains two complementary formulas for computing the value of DR. The formulas, corresponding to the two kinds of data passed by the CALC routine, are outlined in the remainder of this section.

PRE STEADY STATE

Prior to steady state, the value of the constant K has no meaning in terms of system operation. The operation of the system requires a reactive type of formula for computing the number of calls to add to the system. The symbolic expression of the basic formula is listed below.

$$DR = (AG - (QC + SC))$$

| SYMBOL/DEFINITION | | |
|---|---|---|
| DR | — | Incremental number of Dial Requests |
| AG | — | The current number of Agents available |
| QC | — | The number of Queued Calls |
| SC | — | The number of Setup Calls |

POST STEADY STATE

The value of the constant K is significant in terms of the pacing operation once the system is at steady state. The system requires use of a predictive formula to compute the number of calls to add to the system. The post steady state symbolic formula is listed below.

$$DR = (K - AG - (TA + QC + SC))$$

| SYMBOL/DEFINITION | | |
|---|---|---|
| DR | — | Incremental number of Dial Requests |
| K | — | The constant number of calls desired within the system |
| AG | — | The current number of Agents available |
| TA | — | The current Total number of Agents working |
| QC | — | The number of Queued Calls |
| SC | — | The number of Setup Calls |

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

APPENDIX A

The variables of interest are defined as follows:

| | |
|---|---|
| [K] | The total number of calls being managed simultaneously by the ACD for this queue. |
| [M] | The number of servers for this queue. |
| [H] | Average server hold time |
| [S] | Average calls set-up time (including the adverse effect of calls not completed) |
| [R] | Rate of connection to servers |
| [Q] | Average number of calls in this queue |
| [QMAX] | Maximum permissible number of calls in this queue |
| [D] | Average delay in queue |
| [DMAX] | Maximum permissible average delay in queue |
| [I] | Average number of idle servers |

$$q(i + 1) = (i + 1) * f(i + 1) - f(i) * R * S \quad (1)$$

APPENDIX A-continued $$f(i+1) = f(i) + g(i+1) \quad (2)$$
$$g(i+1) = g(i) * R * S/(i+1) \quad (3)$$
$$D = q(i+1) * e^{-RS/R} \quad (4)$$
$$R = (M - I)/H \quad (6)$$
$$K = NS + NQ + NA \quad (7)$$

where: NS = number of calls being set up (dialed, awaiting response)
NQ = number of calls queued awaiting a server
NA = number of calls connected to servers
NI = number of idle servers $$QMAX = K - M \quad (8)$$
$$K = QMAX + M \quad (5)$$
$$NI = 0 \text{ if } NS < = QMAX \quad (9)$$
$$NI = NS - QMAX \text{ if } NS > QMAX \quad (10)$$
$$NQ = QMAX - NS \text{ if } NS < QMAX \quad (11)$$
$$NQ = 0 \text{ if } NS > = QMAX \quad (12)$$
$$P(NS) = e^{(-R*S)} (R * S)^{NS}/NS! \quad (13)$$
$$P(NS) = F * (R * S)^{NS}/NS! \text{ for } 0 < NS < = K \quad (14)$$

where:

$$1/F = \sum_{i=0}^{K} (R * S)^i / i \quad (15)$$

$$I = F * \sum_{i=QMAX}^{\infty} (R * S)^i (i - QMAX)/i! \quad (16)$$

$$Q = F * \sum_{i=0}^{QMAX-1} (R * S)^i (QMAX - i)/i! \quad (17)$$

$$Q - I = QMAX - (R * S) \quad (18)$$
$$D = Q/R \quad (19)$$

What is claimed is:

1. A method of automatically selecting and dialing customer telephone at a paced rate and keeping a plurality of agent stations at full occupancy, comprising:
   providing a database containing telephone numbers to be called;
   providing a computer for controlling the pacing of telephone numbers to be called connected to said database;
   providing an automatic call distribution system for dialing the telephone numbers and establishing connection to the customer telephone and connected to said computer;
   providing a plurality of agent stations connected to said computer and to said automatic call distribution system;
   determining the maximum number, K, of calls to be in progress at any time by calculating the maximum number, K, such that an average number, Q, of calls waiting in a queue does not exceed a selected delay, DMAX;
   initiating a new call only when there are less than K calls existing; and
   for a set up state determining the number, NQ, of calls waiting in queue from the maximum permissible number, QMAX, of calls waiting in queue less a known number, NS, of calls dialed and waiting a response;
   determining the probability P(NS) of having exactly NS calls in the set-up state from $$P(NS) = e^{(-R*S)}(R*S)^{NS}/NS$$

where R is the rate of connection to agents and S is the average call set-up time, setting QMAX equal to a large value;
determining the average number, Q, of calls waiting in queue from $$Q = F * \sum_{i=0}^{QMAX-1} (R*S)^i (QMAX - i)/i!$$

where $$1/F \text{ is } \sum_{i=0}^{K} (R*S)^i/i;$$

determining the average delay D, in queue from D=Q/R; decreasing QMAX and recalculating Q until D exceeds DMAX; and
determining the value, K, from K=QMAX+M.

2. A method of automatically selecting and dialing customer telephones at a paced rate and keeping a plurality of agent stations at full occupancy, comprising:
   providing a database containing telephone numbers to be called;
   providing a computer for controlling the pacing of telephone numbers to be called connected to said database;
   providing an automatic call distribution system for dialing the telephone numbers and establishing connection to the customer telephone and connected to said computer;
   providing a plurality of agent stations connected to said computer and to said automatic call distribution system;
   determining the maximum number, K, of calls to be in progress at any one time by calculating the maximum number, K, such that an average number, Q, of calls waiting in a queue does not exceed a selected delay, DMAX;
   initiating a new call only when there are less than K calls existing; and
   for a set-up state determining the number, NQ, of calls waiting in queue from the maximum permissible number, QMAX, of calls waiting in queue less a known number, NS, of calls dialed and waiting a response;
   determining the probability P (NS) of having exactly NS calls in the set-up state as a function of a rate R of connection to agents and of an average call set-up time S;
   determining the average number, Q, of calls waiting in queue as a function of the rate R, the set-up time S, the maximum number K and a selected large value QMAX;
   determining the average delay D, in queue from D=Q/R;
   decreasing QMAX and recalculating Q until D exceeds DMAX; and
   determining the value, K, from K=QMAX+M.

3. A method of automatically selecting and dialing customer telephones at a paced rate and keeping a plurality of agent stations at full occupancy, comprising:
   providing a database containing telephone numbers to be called;
   providing a computer for controlling the pacing of telephone numbers to be called connected to said database;
   providing an automatic call distribution system for dialing the telephone numbers and establishing connection to the customer telephone and connected to said computer;
   providing a plurality of agent stations connected to said computer and to said automatic call distribution system;

providing a plurality of queues each with assigned agent stations for servers to service calls;

providing sets of dynamic variables which are measurements of current call performance for each queue, average server hold time, average call set-up time, rate of connection of calls to servers, and average number of calls in the delay queue;

providing a set of dynamic variables which are the current number of agents signed-in at agent stations to serve each queue;

determining for each queue the maximum number, K, of calls to be in progress at any one time based upon an iterative algorithm which uses the dynamic variables and calculated probabilities for the numbers of calls in various call set-up states; and initiating a new call only when there are less than K calls existing.

4. The method described in claim 3, wherein the method further comprises calculating the maximum number, K, such that an average number, Q of calls waiting in a queue does not exceed a selected delay, DMAX.

5. The method described in claim 4, wherein the method further comprises for the set-up state determining the number, NQ, of calls waiting in queue from the maximum permissible number, QMAX, of calls waiting in queue less a known number, NS, of calls dialed and waiting a response;

determining the probability P(NS) of having exactly NS calls in the set-up state from $$P(NS) = e^{(-R*S)}(R*S)^{NS}/NS$$

where R is the rate of connection to agents and S is the average call set-up time, setting QMAX equation to a large value;

determining the average number, Q, of calls waiting in queue from $$Q = F * \sum_{i=0}^{QMAX-1} (R*S)^i (QMAX - i)/i!$$

where $$1/F \text{ is } \sum_{i=0}^{K} (R*S)^i/i!;$$

determining the average delay D, in queue from $D = Q/R$;

decreasing QMAX and recalculating Q until D exceeds DMAX; and determining the value, K, from $K = QMAX + M$.

* * * * *